United States Patent [19]
Parkyn, Jr. et al.

[11] Patent Number: 5,577,493
[45] Date of Patent: Nov. 26, 1996

[54] AUXILIARY LENS TO MODIFY THE OUTPUT FLUX DISTRIBUTION OF A TIR LENS

[75] Inventors: William A. Parkyn, Jr., Costa Mesa; David G. Pelka, Los Angeles, both of Calif.

[73] Assignee: TIR Technologies, Inc., Carson City, Nev.

[21] Appl. No.: 294,223

[22] Filed: Aug. 22, 1994

Related U.S. Application Data

[63] Continuation-in-part of Ser. No. 869,003, Apr. 16, 1992, Pat. No. 5,404,869.

[51] Int. Cl.$^6$ .................................................... F24J 2/08
[52] U.S. Cl. ......................... 126/699; 126/698; 126/700
[58] Field of Search ................................. 126/698, 699, 126/700

[56] References Cited

U.S. PATENT DOCUMENTS

| | | |
|---|---|---|
| 1,421,506 | 7/1922 | Limpert . |
| 3,915,148 | 10/1975 | Fletcher et al. . |
| 3,941,993 | 3/1976 | Hubert . |
| 3,970,070 | 7/1976 | Meyer et al. . |
| 4,002,031 | 1/1977 | Bell . |
| 4,022,186 | 5/1977 | Northrup, Jr. . |
| 4,050,789 | 9/1977 | Herbert ............................. 126/698 X |
| 4,074,704 | 2/1978 | Gellert . |
| 4,103,673 | 8/1978 | Woodworth et al. . |
| 4,108,540 | 8/1978 | Anderson et al. . |
| 4,116,223 | 9/1978 | Vasilantone . |
| 4,124,017 | 11/1978 | Paull . |
| 4,136,670 | 1/1979 | Davis . |
| 4,171,695 | 10/1979 | Sletten . |
| 4,194,949 | 3/1980 | Stark . |
| 4,198,953 | 4/1980 | Power ................................. 126/699 X |
| 4,282,858 | 8/1981 | Bowers, Jr. ........................ 126/699 X |
| 4,299,201 | 11/1981 | Tsubota ............................. 126/700 X |
| 4,337,759 | 7/1982 | Popovich et al. ................... 126/698 X |
| 4,755,921 | 7/1988 | Nelson . |
| 4,805,984 | 2/1989 | Cobb, Jr. ............................... 385/133 |
| 5,059,013 | 10/1991 | Jain ....................................... 359/503 |
| 5,150,966 | 9/1992 | Nelson . |
| 5,381,309 | 1/1995 | Borchardt ................................ 362/31 |

FOREIGN PATENT DOCUMENTS

| | | |
|---|---|---|
| 1325086 | 8/1973 | United Kingdom . |
| 1325087 | 8/1973 | United Kingdom . |
| 1546791 | 5/1979 | United Kingdom . |
| 1546792 | 5/1979 | United Kingdom . |
| 1546793 | 5/1979 | United Kingdom . |
| 1557472 | 12/1979 | United Kingdom . |
| 1561129 | 2/1980 | United Kingdom . |
| 2239939 | 1/1993 | United Kingdom . |
| 2239940 | 12/1993 | United Kingdom . |

*Primary Examiner*—Larry Jones
*Attorney, Agent, or Firm*—William W. Haefliger

[57] ABSTRACT

A TIR lens having a central axis, and toward which light from a light source is to be directed, and a light ray deviator positioned along the path of light travel between the source and the TIR lens, for deviating light rays toward portions of the lens spaced from the axis, thereby to more evenly distribute light flux at the output of the TIR lens.

28 Claims, 17 Drawing Sheets

5,577,493

AUXILIARY LENS TO MODIFY THE OUTPUT FLUX DISTRIBUTION OF A TIR LENS

BACKGROUND OF THE INVENTION

This application is a continuation-in-part of Ser. No. 07/869,003 filed Apr. 16, 1992 U.S. Pat. No. 5,404,869, Apr. 11, 1995.

This invention relates generally to radiant, particularly electromagnetic, energy concentration, redirection, and manipulation, and improves over the subject matter of U.S. Pat. No. 4,337,759. It more particularly concerns apparatus and method for employing a transparent lens means with elements thereof using Total Internal Reflection (TIR).

Because of its low aspect ratio, the TIR lens exhibits strong coma, an aberration arising from the different distances from the light source of the various facets of the lens. That is, the central part of the lens is so much closer to the source that its light output has wider angular divergence than light coming from the edge of the lens. This causes the flux at the center of the lens to be much higher than that at the edge, approximately in inverse proportion to the square of the distance of a facet from the source. Thus, the flux at the center of the lens can be over five times higher than at the edge.

In some applications, such non-uniformity makes the TIR lens less desirable, in spite of its compactness and efficiency. Backlighting of liquid crystal displays is a prominent example. What is needed is a way to magnify the image of the source for sideways directions (i.e., towards the rim of the TIR lens), while demagnifying it for upward directions (i.e., along the axis of symmetry of the TIR lens). Conventional optical design methods are inapplicable to this problem, since they deal with image formation; whereas, the TIR lens is a non-imaging device. This is an illumination problem, not an image-forming one. The nonuniformity can be reduced, but not eliminated, by using a narrow cylindrical source.

SUMMARY OF THE INVENTION

It is a major object of the invention to provide a solution to the above difficulties. Basically, the invention is embodied in a combination that includes:

a) a TIR lens having a central axis, and toward which light from a light source is to be directed, and b) a light ray deviator positioned along the path of light travel between the source and the TIR lens, for deviating light rays toward portions of the lens spaced from the axis, thereby to more evenly distribute light flux at the TIR lens.

As will be seen, the deviator is typically a smooth refractor lens having dome shape toward the TIR lens, but alternatively may be an externally faceted Fresnel lens.

The invention is usable with displays, such as liquid crystal displays, and enhances their practicality by enabling incandescent light sources to provide uniform brightness.

These and other objects and advantages of the invention, as well as the details of an illustrative embodiment, will be more fully understood from the following specification and drawings, in which:

DRAWING DESCRIPTION

DETAILED DESCRIPTION

Figure 1:
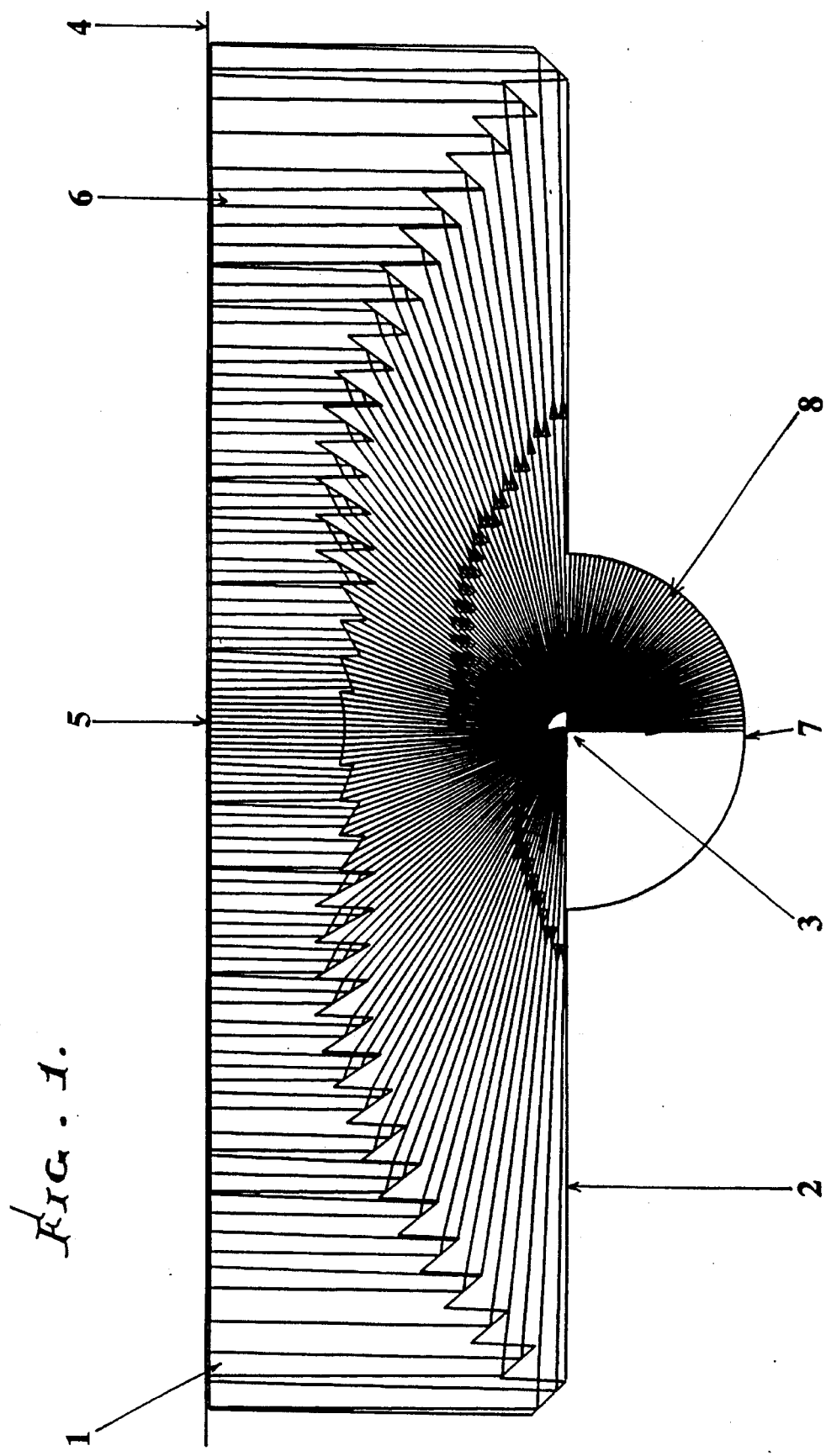
FIG.1 is a diagram showing a TIR lens, and auxiliary reimaging reflector, collimating light from an isotropic point source of light, but with nonuniform output.

FIG. 1 shows a typical TIR lens 1 collimating the flux 2 from isotropic point source 3 onto screen 4. For the sake of clarity only the right half of the source's rays are shown. The rays 5 coming out the center of the lens are closer together than rays 6 at the outer edge region, indicating higher flux levels near the center than at the edges. Reflector 7 below source 3 sends downward rays 8 to the left side of the lens, in effect reimaging the source.

Figure 2:
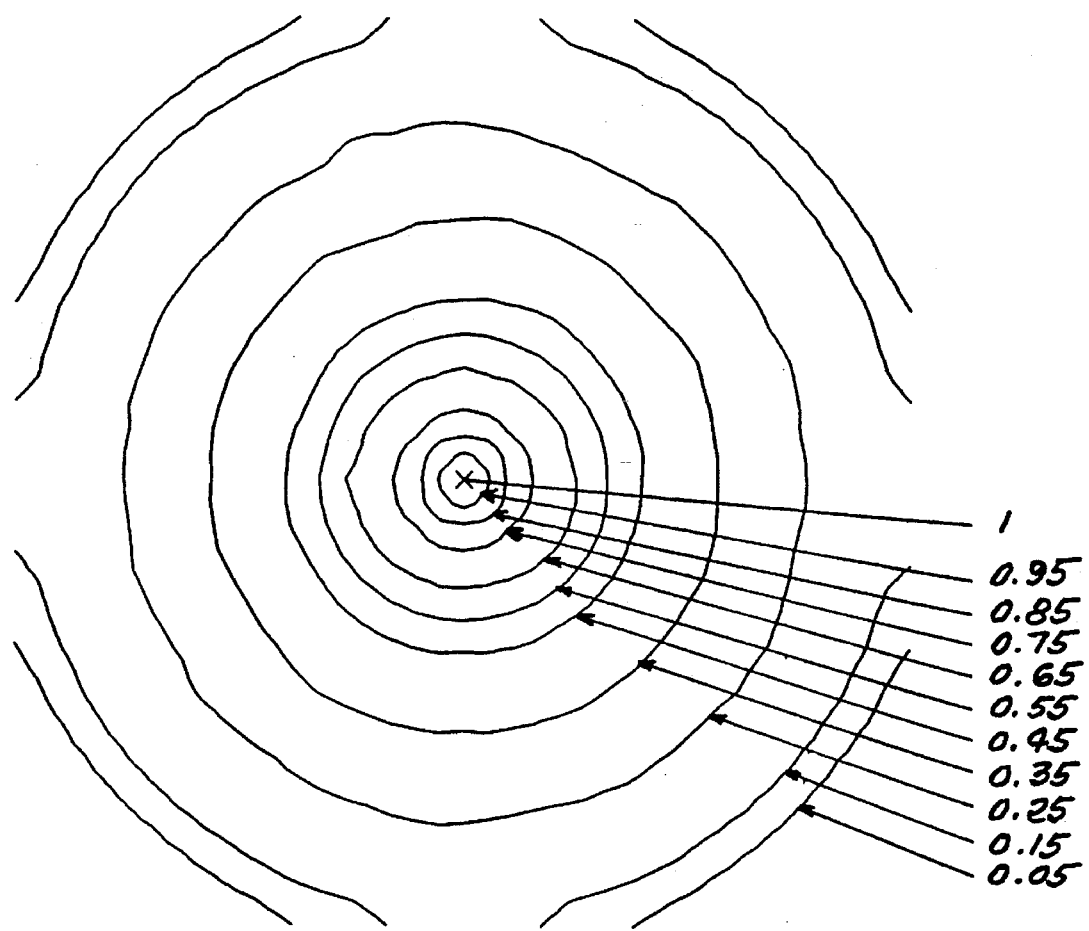
FIG. 2 is a contour map and a corresponding three-dimensional isometric plot in FIG. 2a of the highly non-uniform flux density just above the TIR lens in FIG. 1 (i.e., at the exit side), as generated by a Monte-Carlo ray-trace computer simulation.
Figure 2A:
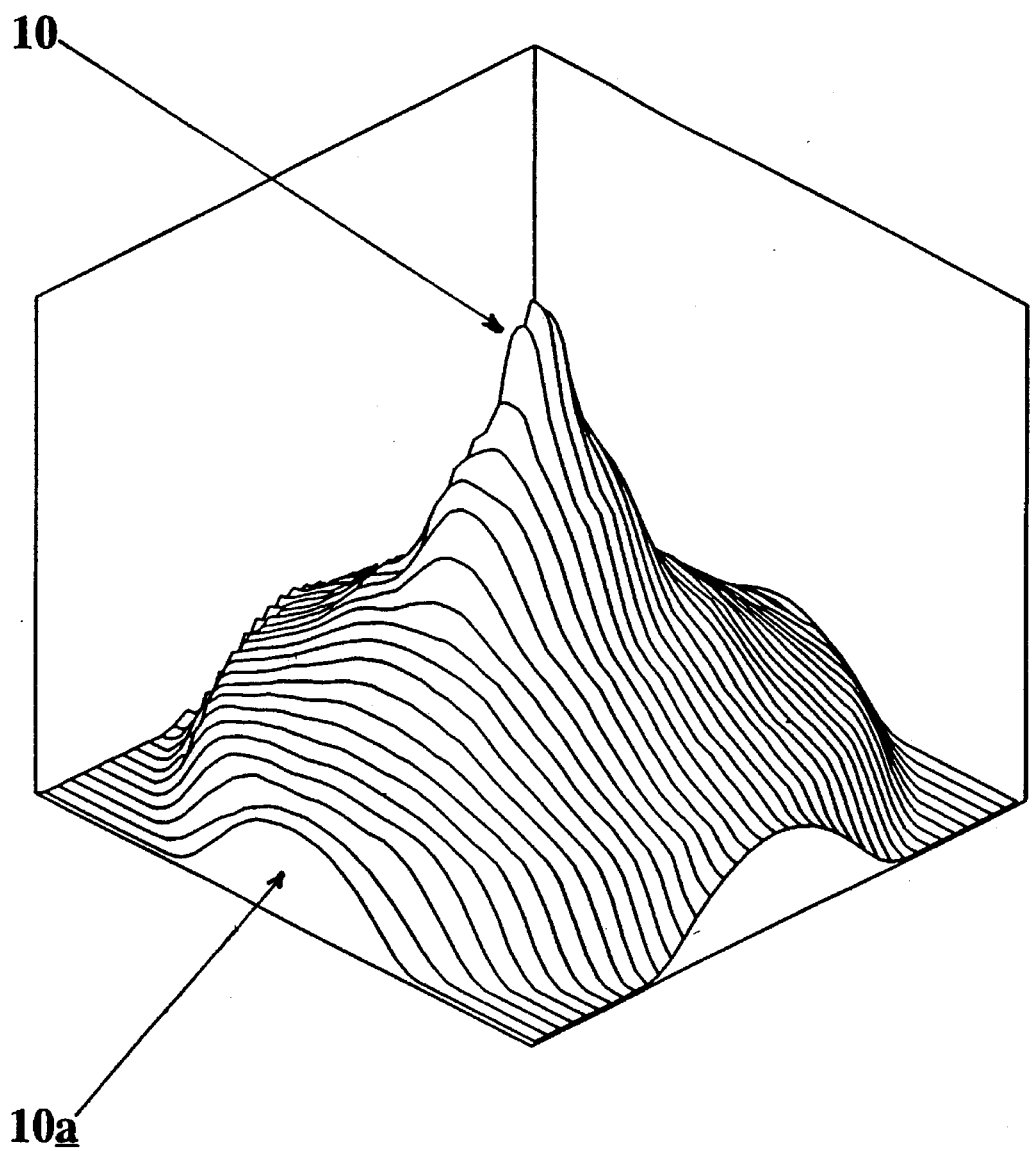

FIG. 2 and FIG. 2a show the results of a computer-simulation ray trace through the lens and reflector of FIG. 1. This simulation utilizes the Monte Carlo method, whereby a large number of rays are sent in random directions and traced through reflector and TIR lens to the screen. The resulting distribution of ray hits on the screen is used to generate FIG. 2. On the left in FIG. 2 is a contour map of a computerized ray trace deriving the highly non-uniform light flux density just above lens 1, with relative density levels as labeled. On the right in FIG. 2a is the corresponding three-dimensional plot of this flux density. There is a prominent central hot spot 10, with steady fall off of light flux per unit area toward the dimly illuminated edges at 10a of the contour plot.

In accordance with the present invention, provision is made to alleviate or eliminate this variable light flux per unit area by matching the light source's angular variations in output with corresponding locations on the TIR lens, in effect spreading the light out from the peak until a flat distribution is achieved.

Figure 3:
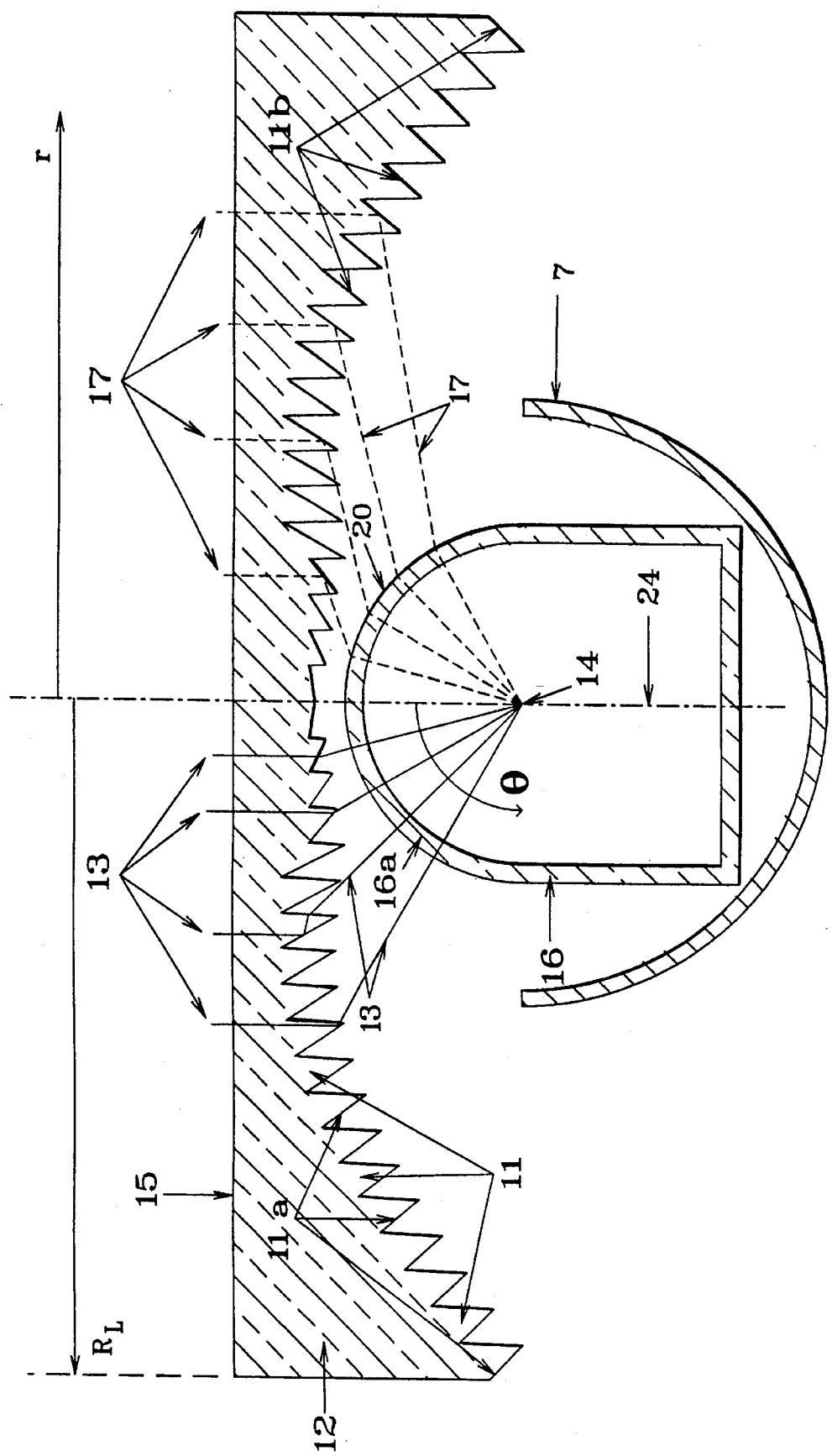
FIG. 3 is a diagram, in section, showing the r(Θ) mapping requirement of a TIR lens in combination with a thin light deviator in the light path between a light source and the TIR lens.

Referring to FIG. 3, which illustrates the design methodology of this invention, uniform light flux output at the exit face 15 of TIR lens 12 (having radius $R_L$) means that the fractional flux exiting the lens within a circle of radius r is simply $(r/R_L)^2$. On the other hand, the light coming out isotropic (uniform in solid angle) source 14 into a cone-shaped solid angle with an apex angle $\Theta$ has a fractional flux of $(1-\cos\Theta)$. Actually, this is true only for the combination of source 14 and retroreflector 7 below source 14. This combination radiates light upward into the angular range $0 \leq \Theta \leq 90°$, which a TIR lens collects and collimates, e being measured from source 14.

To match the isotropic source with a uniformly emitting TIR lens, a ray emanating from source 14 at an angle $\Theta$ (0° to 90°) from axis 24 must be bent outward so that it goes to a facet at radial location given by $$r = R_L \sqrt{(1-\cos\Theta)} \text{ with } 0 \leq r \leq R_L \quad (1)$$

For a non-isotropic source having angularly variable intensity $I(\Theta)$, the integrated relative intensity $J(\Theta)$ varies between 0 at $\Theta=0°$ and 1 at $\Theta=90°$ and is given by $$J(\theta) = \frac{\int_0^\theta I(\Phi) \sin(\Phi) \, d\Phi}{\int_0^{\pi/2} I(\Phi) \sin(\Phi) \, d\Phi} \quad (2)$$

where $\Phi$ is a customary dummy variable of angular integration.

Figure 4:
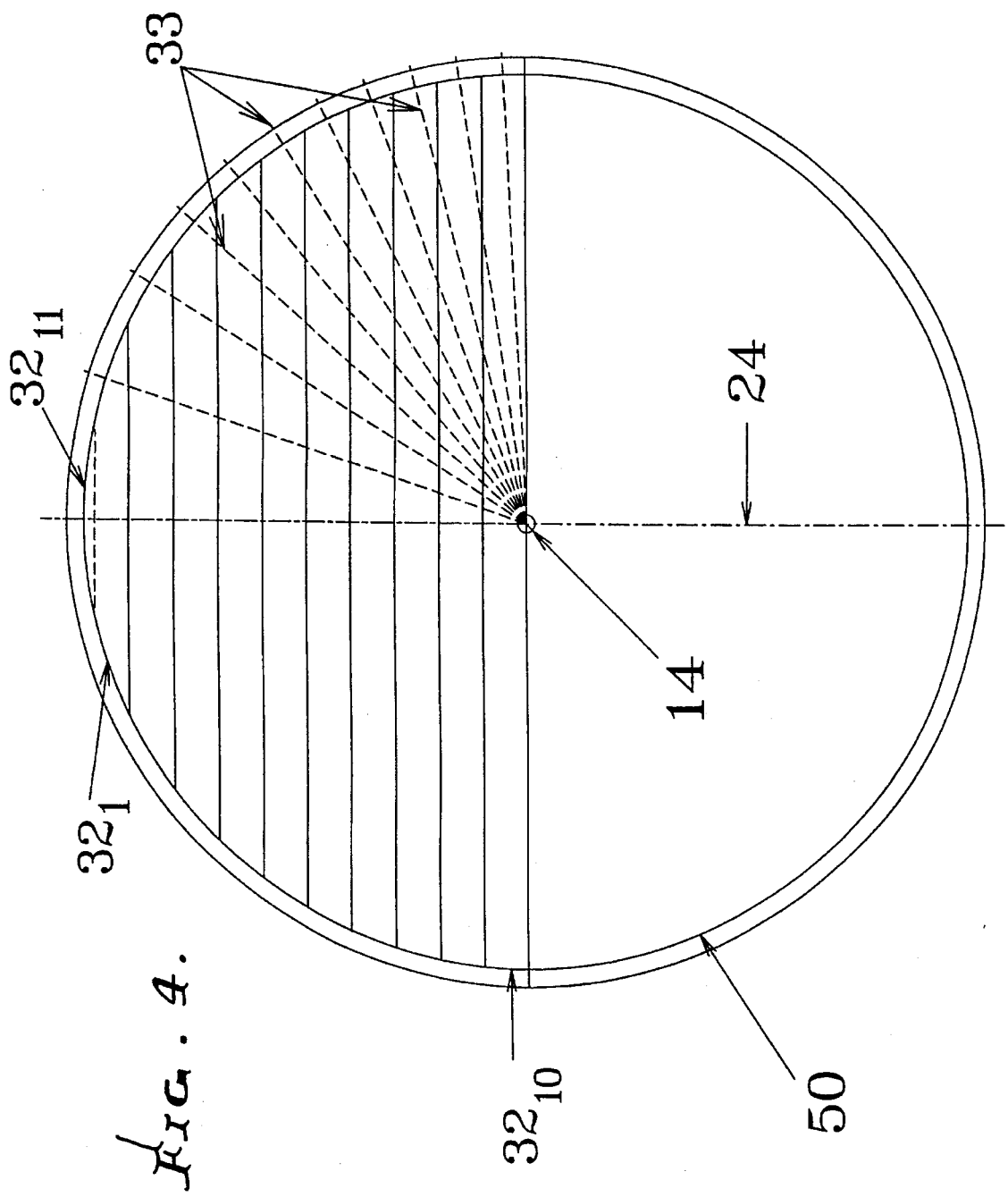
FIG. 4 is a diagram showing the preferred method of measuring the intensity function I(Θ) of the combination of source and reflector.

FIG. 4 shows how the intensity distribution $I(\Theta)$ of a lamp and reflector would be measured. Collector hemisphere 32, of radius $R_H$, is divided into sections $32_1$ to $32_{10}$ of equal area, and covers source 14 and reflector 50, so as to collect all their light output. In order to measure the intensity distribution $I(\Theta)$ as a function of equal solid angles, N sections shown need only have equal height $R_H/N$ to ensure they all have the same interior surface area. The total light $I_i$ received by section i, having specific angles $\Theta_i$ as shown by the radial dashed lines 33, is an approximation to $I(\Theta_i)$. The accuracy of the approximation increases with the number of sections. With a non-homogeneous source, the average direction $\beta_i$ of light received by collector section i will differ somewhat from $\Theta_i$, and would be used in its place in the analysis below. There is, however, a complication with section $32_i$, in that its inclusion about central axis 24 would cause it to integrate out the intensity information for direction $\Theta_1$. Accordingly, there must be a small polar section $32_{11}$, to measure the intensity in the direction of axis 24.

Light emitted at an angle e must be deviated to radius $r(\Theta)$ at exit face 15 of TIR lens 12, where:

$$r(\theta) = R_L \sqrt{J(\theta)} \quad (3)$$

Note that in FIG. 3, the facets 11 of the TIR lens 12 have surfaces 11a angled relative to axis 24 to collimate the undeviated rays 13 from source 14 that pass radially through the source envelope 16, whose dome wall 16a extends hemispherically about source 14. A new set of facets with angled surfaces 11b, on a somewhat higher profile (not shown here, but detailed in FIG. 6), is required to collimate the deviated rays 17 refracted by Fresnel-lens deviator 20 (FIG. 5) situated on the exterior of dome wall 16a.

The same intensity-mapping method can be used to generate some desired non-uniform illumination profile $I(r)$, by specifying its cumulative integral $J(r)$ (see (4) below) and inverting it to obtain the function $r(J)$. These operations would typically be done numerically, with $r(\Theta)=r[J(\Theta)]$ implemented as a lookup table in a computer program that designs the combination of TIR lens and mushroom lens. The function $J(r)$ is defined from $I(r)$ as:

$$J(r) = \frac{\int_0^r I(x) \times dx}{\int_0^{R_L} I(x) \times dx} \quad (4)$$

In the above, r is the radial distance of a facet from axis 24, and x is a customary dummy variable of spatial integration. Most light sources are close enough to isotropic that the deviation of rays at $\Theta$ to the facet at $r(\Theta)$ can be done by refraction. Two ways to accomplish this include use of either a thin lens or a thick lens. Since it is analytically easier to derive a thin, or Fresnelized version, this will be done first.

Figure 6:
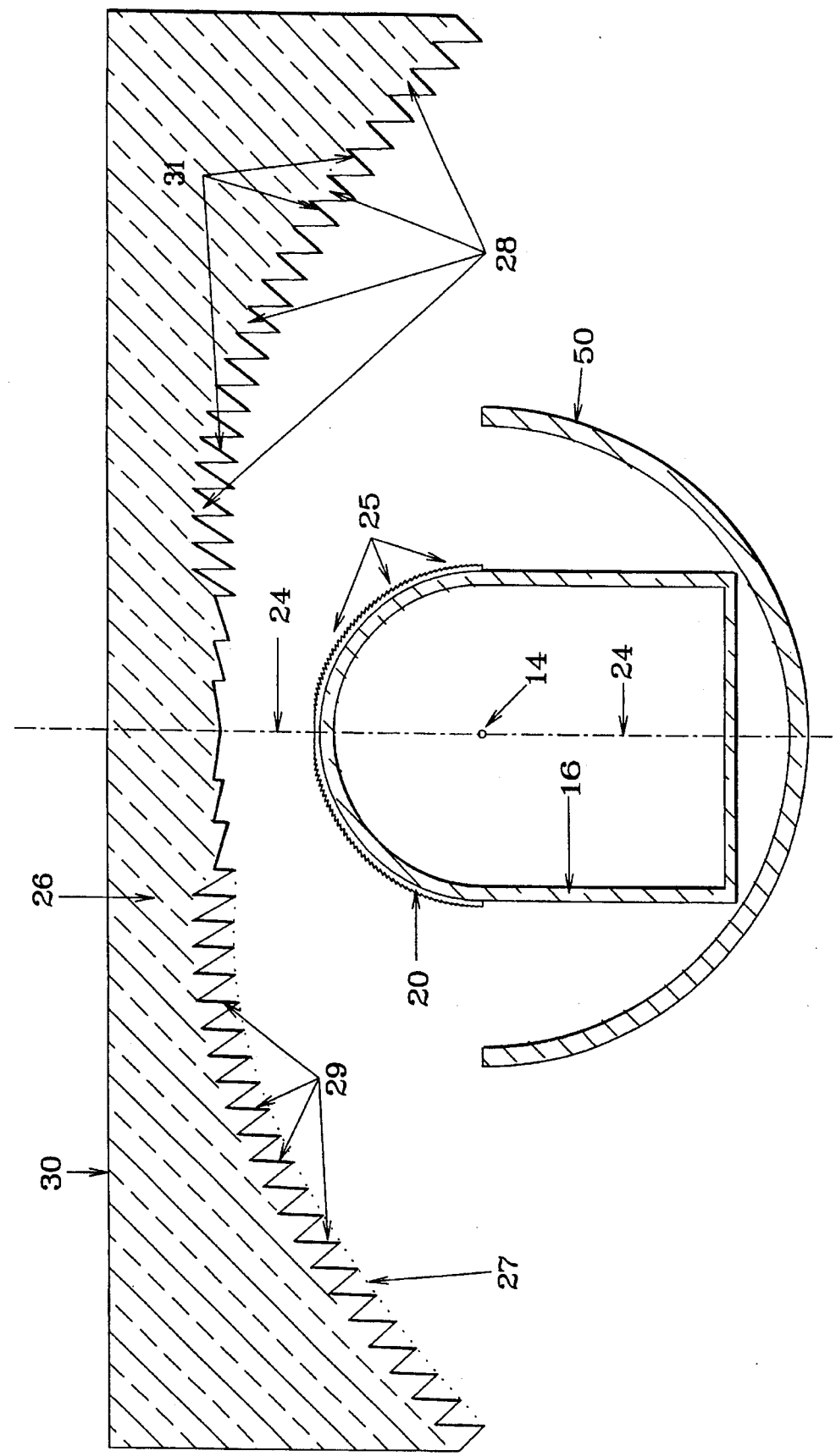
FIG. 6 is a section showing use of the FIG. 5 Fresnel lens as a light deviator, in combination with a TIR lens and reimaging reflector.

For a thin hemispherical Fresnel lens of radius $R_F$ centered upon light source 14, a ray at angle $\theta$ must be deviated to the angle $\alpha$, given by $$\alpha = \tan^{-1} \frac{r(\Theta) - R_F \sin(\Theta)}{z(\Theta) - R_F \cos(\Theta)} \quad (5)$$

where $z(\theta)$ is the height of the TIR lens facet at $r(\theta)$. In an actual lens design, a trial profile $z(r)$ is used to generate a corresponding deviator lens, then a new profile is generated from this deviator lens. Then a new deviator lens is generated for this new profile. Repeating this iteration, another TIR lens profile is generated, until the TIR lens and the deviator lens are matched. Usually three iterations are sufficient. Referring to FIG. 6, profile 27 is appropriate for deviator lens 20 when the rays from the deviator enter the entry faces 29 and fully illuminate TIR faces 31, but with no light lost to leakage over the top of the TIR faces. Because the deviator lens makes the rays appear to come from a virtual source that is above the real source, the TIR lens profile 27 is raised.

The required tilt angle P of each Fresnel facet on the hemispheric deviator lens is given by $$P(\Theta) = \Theta - \tan^{-1} \frac{\sin(\Theta)\left(1 + \frac{1}{n-1}\right) - \frac{\sin(\alpha)}{n-1}}{\cos(\Theta)\left(1 + \frac{1}{n-1}\right) - \frac{\cos(\alpha)}{n-1}} \quad (6)$$

where n is the refractive index of the material of the deviator lens. The rays at $\theta=0$ and $\theta=\pi/2$ (90°) are already going to their proper radii, $r=0$ and $R_L$, so that $P=0$ for them.

Figure 5:
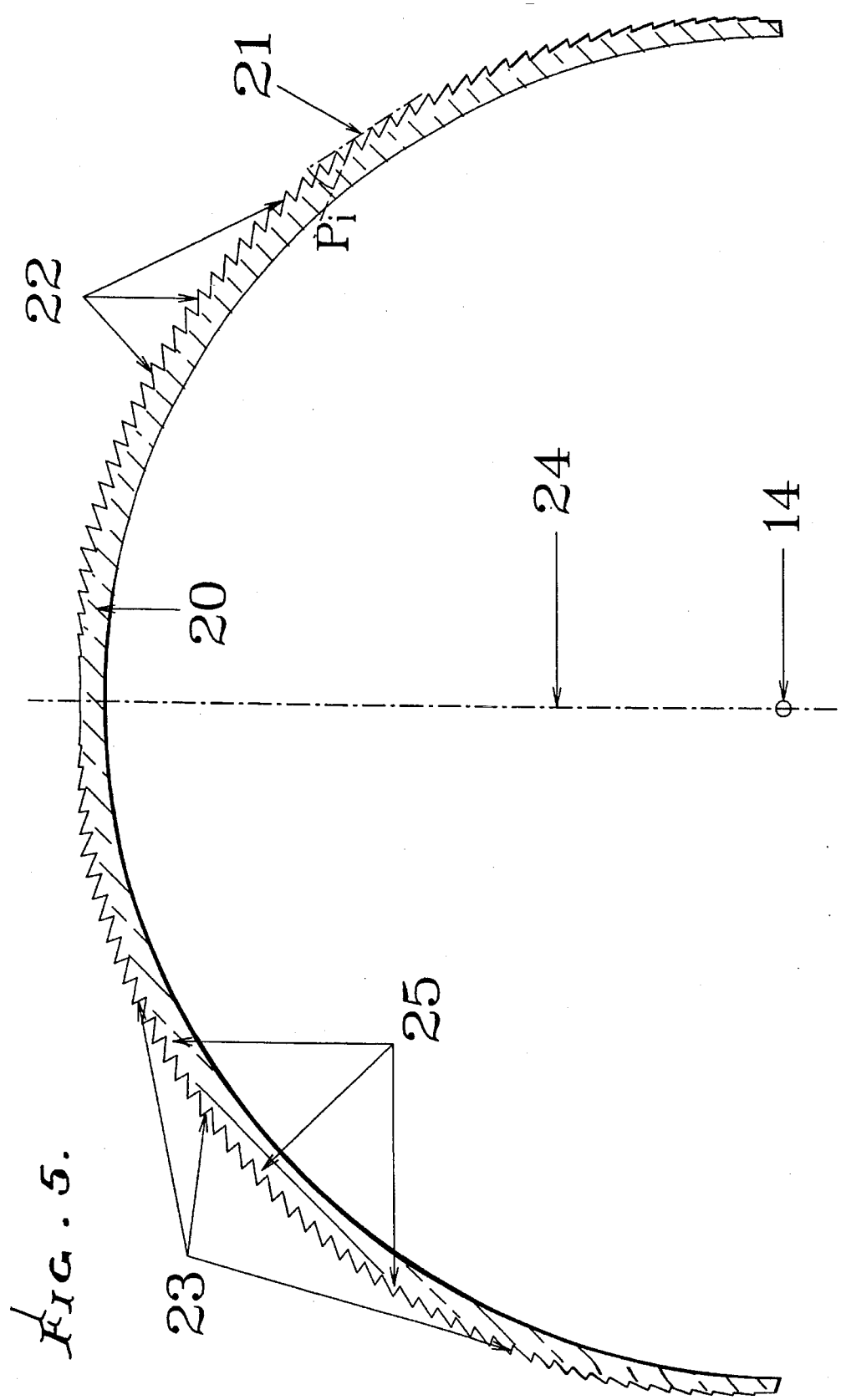
FIG. 5 is the cross-section of a hemispherical, Fresnel-type, light-deviating lens.

FIG. 5 shows the profile of a Fresnel deviator lens 20 that maps the output of an isotropic source 14 to uniform TIR lens output. The lens extends hemispherically about axis 24. Fresnel facets 25 extend annularly about axis 24, with refracting faces 22 of facet number i making the angle $P_i$ with tangent 21; whereas, faces 23 are radially oriented so as to minimally interfere with light from the source at hemisphere center 14. Note that, if this Fresnel deviator lens was to be manufactured by a molding process, either a splitting mold would be necessary for a rigid lens material, or the lens material must be elastomeric, such as optical silicone.

FIG. 6 shows this Fresnel deviator lens 20, along with its associated TIR lens 26, which has a higher profile 27 than the TIR lens in FIG. 3, and, consequently, TIR faces 31, correspond to faces 11b in FIG. 3, are differently angled than TIR faces 11a of collimating TIR lens 12 in FIG. 3. It is desirable that the TIR lens have numerous small facets 27, having entry faces 29 and (in this case) common flat exit face 30, because the mirroring function of each TIR face will within each facet 28 reverse the intensity-radius map r(Θ). Small facets keep this reversal locally confined, so that the Θ(r) function is minimally perturbed. For point source 14 and sufficiently small Fresnel deviator lens facets 25, this local reversal will minimally disturb output uniformity at exit face 30. With extended sources, it is desirable to have small facets on the TIR lens and an equal number of small facets on the Fresnel deviator lens. Then only the middle ray of each TIR lens facet would be used in the derivation of the deviator lens facet angles $P_i$ Note the common central axis 24 for 16, 20, and 26 Facets 25 on the convex hemispherical dome of Fresnel deviator lens 20 face toward entry faces 29 of facets 28 on the concave interior profile 27 of TIR lens Reimaging reflector 50 is discussed below.

The thick version of the intensity-mapping deviator lens, herein termed the "mushroom lens" is easier to manufacture but more laborious to calculate. The mushroom lens radial coordinate is a function of RF(Θ), rather than the constant value of the hemispheric Fresnel-lens deviator in FIG. 5. The mushroom lens, as true with the Fresnel deviator lens, must be derived by a facet-by-facet iteration along a candidate profile of its associated TIR lens. A first order method is simply to extrapolate from the previously derived value of $P_i$, in a series of angles $Θ_i$, derived for facet number i according to equation (2). The resultant profile, resembling the head of a mushroom, is given to first order by $$R_F(Θ_i) = R_F(Θ_{i-1}) \frac{\tan(Θ_i - Θ_{i-1})(1 + \sin(P_{i-1}))}{\cos(P_{i-1} + Θ_i - Θ_{i-1})} \quad (7)$$

A fourth-order Runge-Kutta would provide any degree of accuracy demanded by ultraprecision engineering, by repeated iterations of $Θ_i$. It turns out that the resultant shape closely fits an elliptical toroid. A few higher-order terms should suffice for modern profiling methods. As with the Fresnel deviator lens above, several mushroom-lens-&-TIR lens iterations would be necessary to generate the total system.

Figure 7:
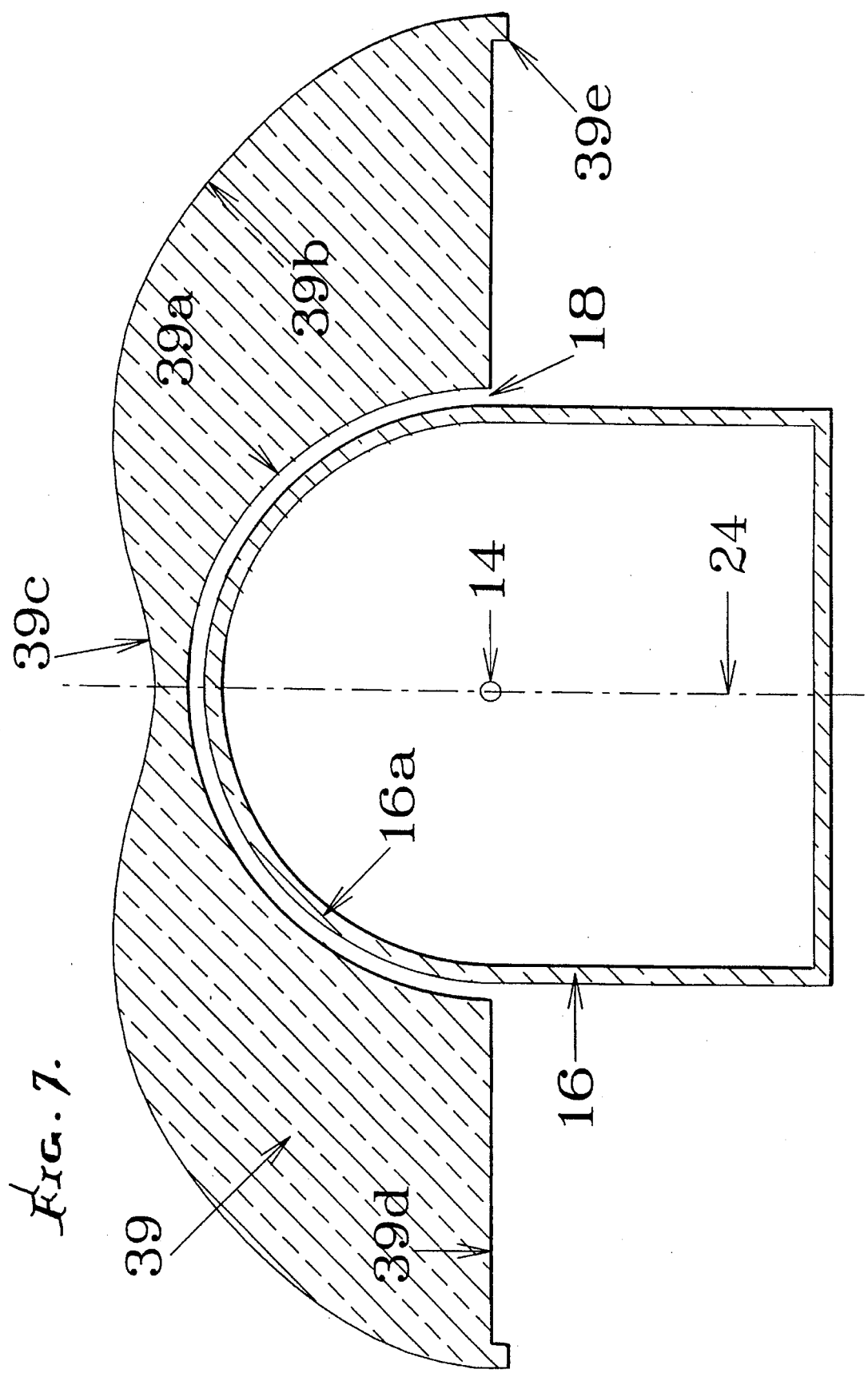
FIG. 7 is a cross section of an incandescent lamp with compact source and its associated light-deviation mushroom lens.
Figure 8:
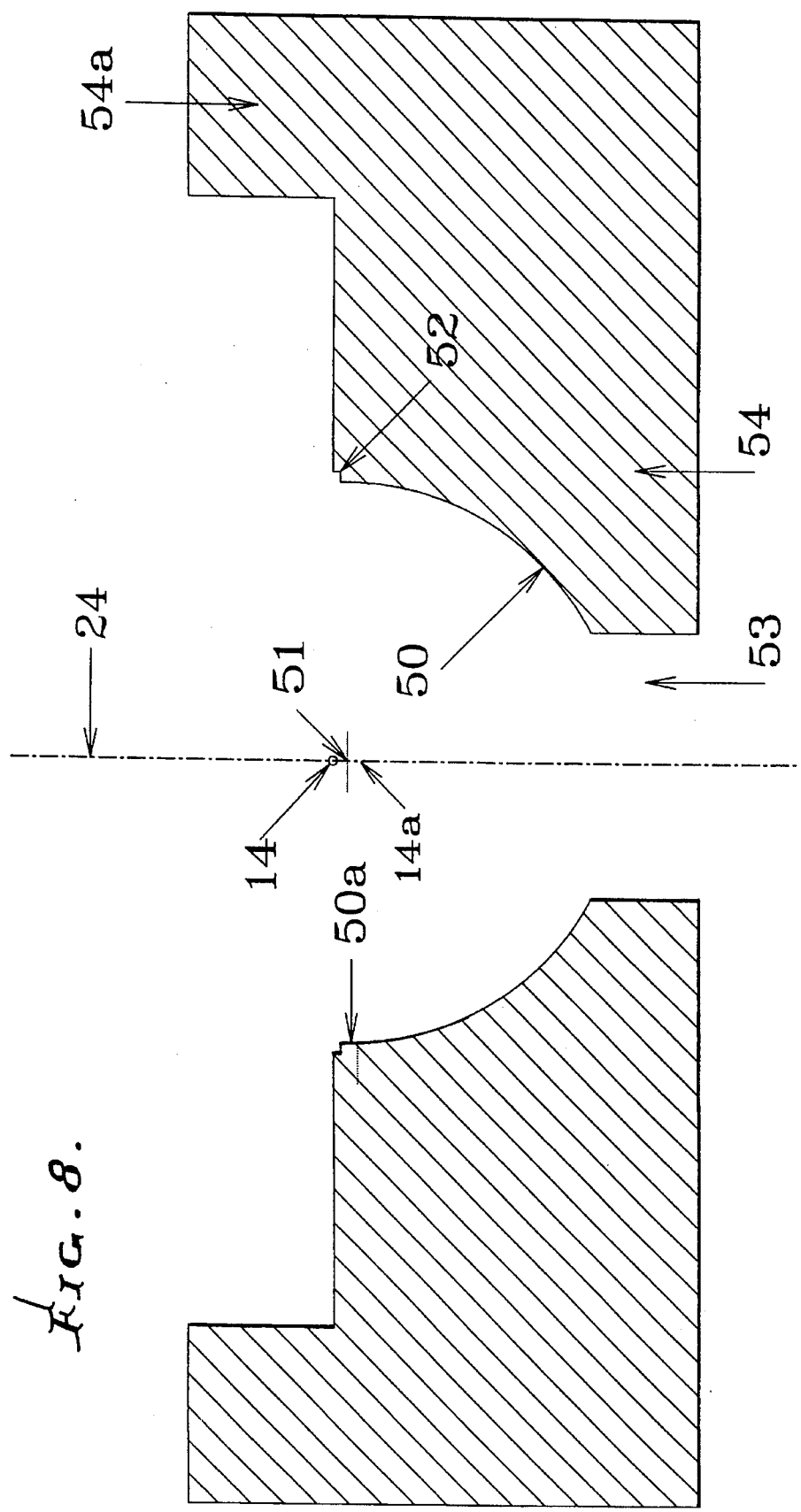
FIG. 8 is a cross section of a reimaging hemispherical reflector.
Figure 9:
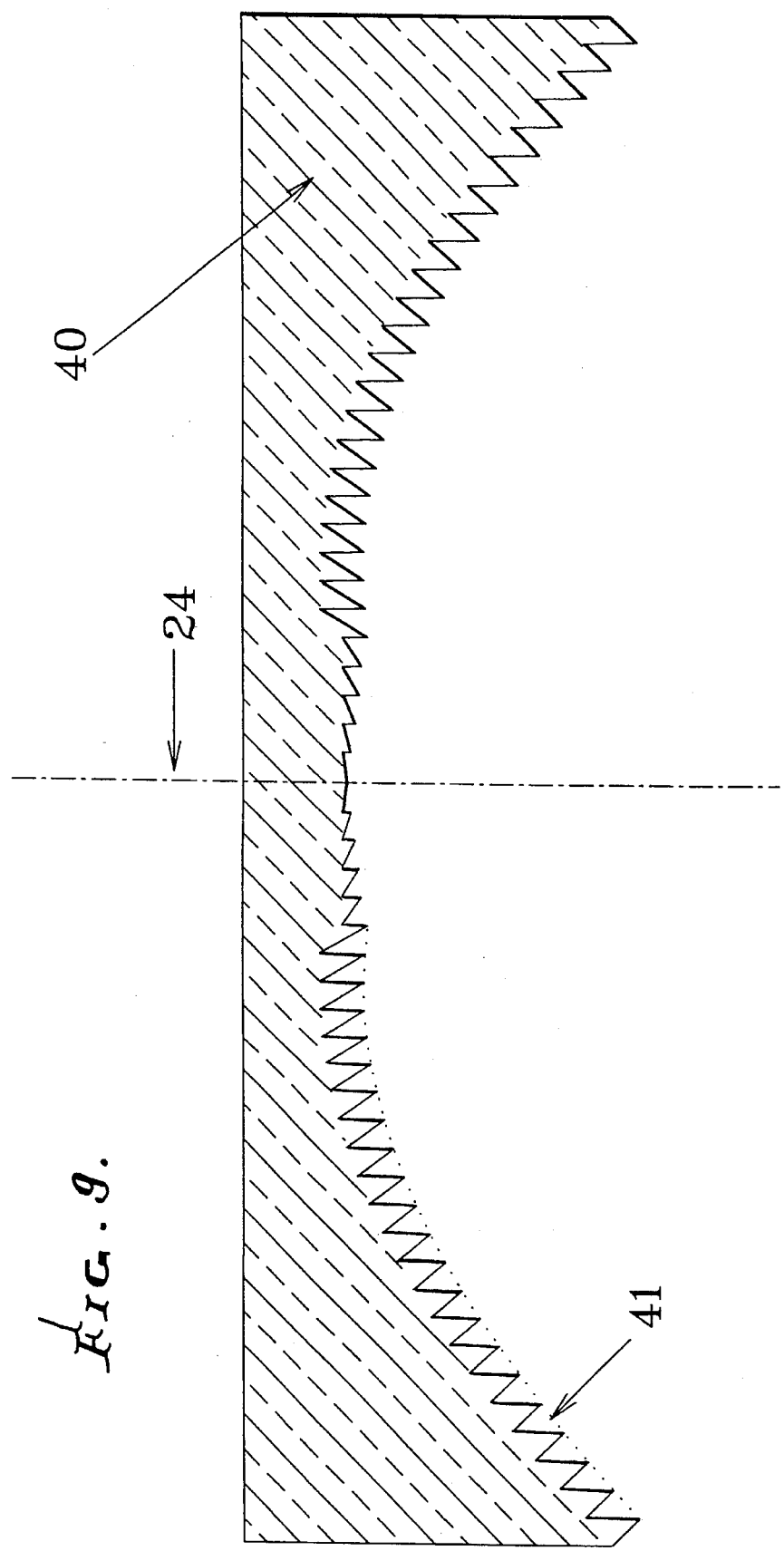
FIG. 9 is a cross section of a TIR lens designed for use in conjunction with a mushroom deviator lens.
Figure 10:
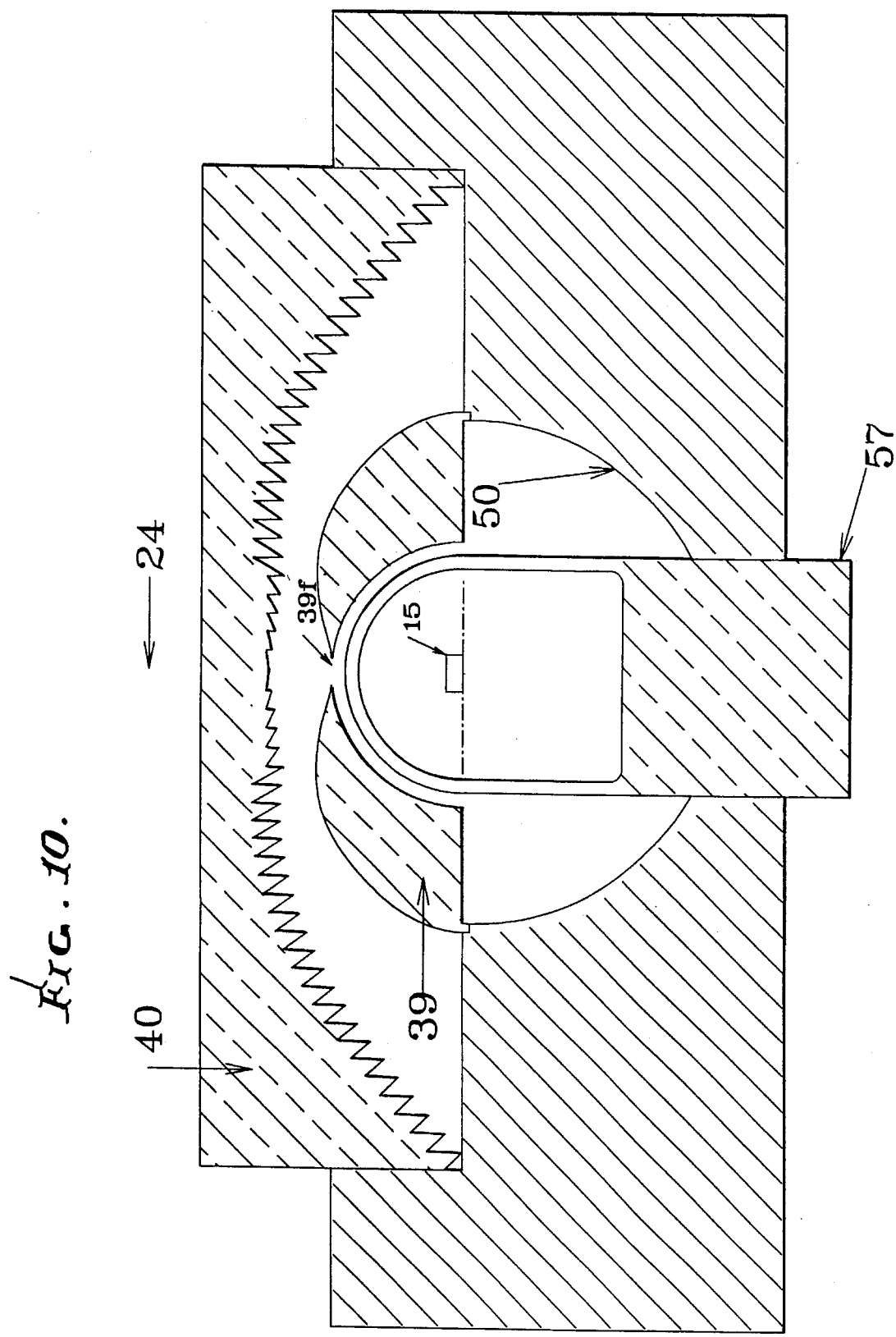
FIG. 10 is a cross section of the combination of mushroom lens, hemispherical reimaging reflector, and a modified collimating TIR lens.

FIG. 7 shows the detailed cross section of the deviating mushroom lens 39 that is used with reflector S0 detailed in FIG. 8 and TIR lens 40, detailed in FIG. 9. The TIR lens has profile 41 that is higher than profile 27 of FIG. 6. The entire system is shown in FIG. 10. The mushroom lens 39 has hemispherically concave inner surface 39a, of greater curvature (i.e., smaller radius) than the varying curvatures of convex outer surface 39b, such curvatures decreasing at regions toward axis 24, becoming concave (demagnifying) at central outer surface 39c. See also reflector 50 extending about axis 24 and operating as discussed below. Flat bottom 39d is coplanar with the outermost tip of TIR lens 40 and with the top of reflector 50. It is thus situated so as to interfere with neither lens nor reflector.

FIGS. 8 and 10 detail the hemispherical reflector 50, with center at 51, which reimages the source, at 14, just below itself, at 14a, Groove 52 receives and positions protrusion 39e on the mushroom lens, as seen in FIG. 7. Reflector section 50, is a cone tangent to the hemisphere at the dotted line shown. This cone prevents multiple reflections back and forth across the hemisphere.

Figure 11:
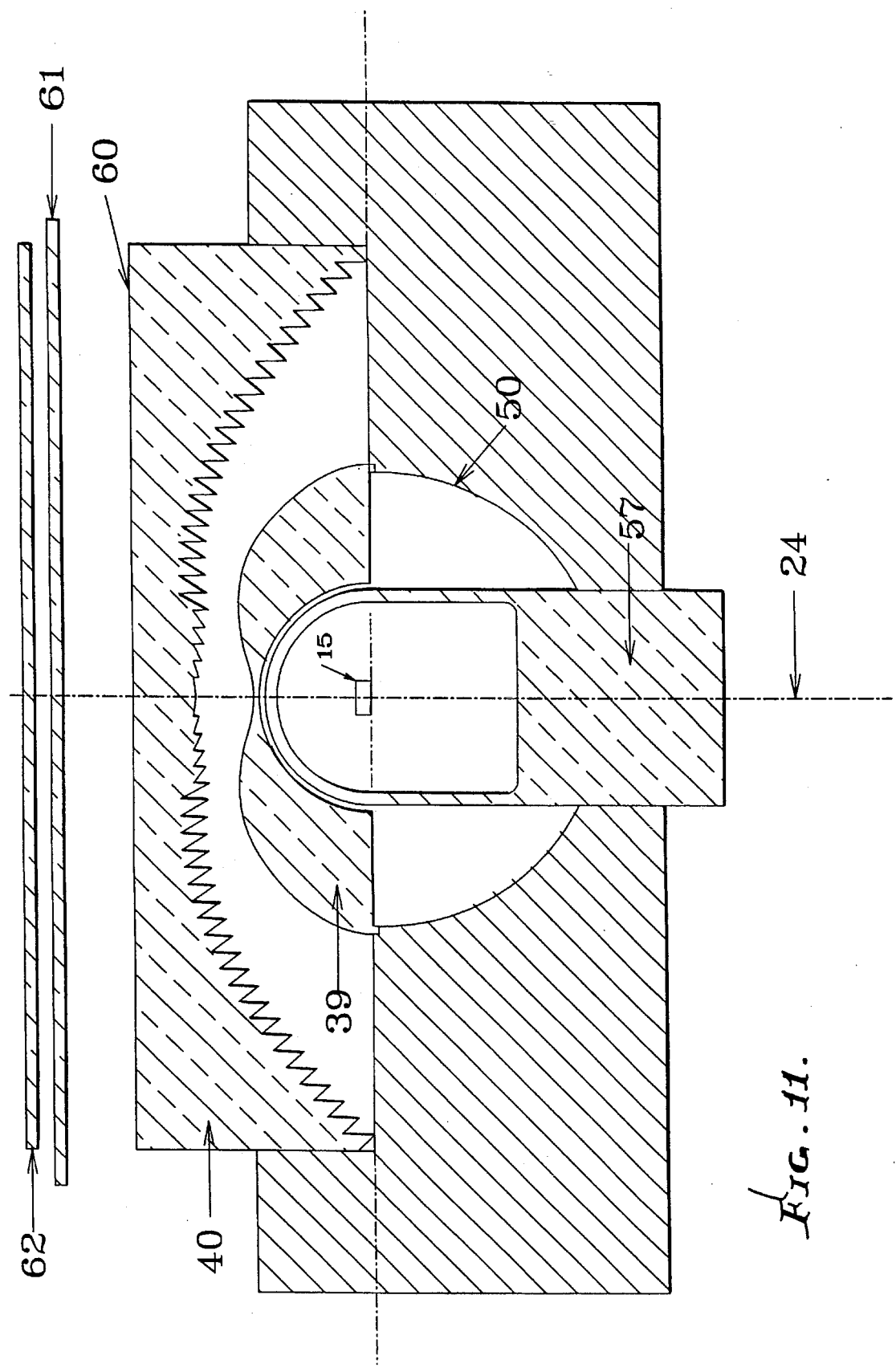
FIG. 11 is a diagram showing the combination of FIG. 10 with diffusers and a liquid crystal display.

FIG. 11 shows the invention in combination with a liquid crystal display 62 (LCD), acting as its light source. A microstructured diffuser 60, which may be a holographic diffuser, is situated on the surface of the exit face of TIR lens 40. It tends to blur the spatial structure imposed by the facets of the TIR lens. A second diffuser 61 spatially integrates this blurring, so that the TIR lens facets are not visible to viewers of the LCD.

Figure 12:
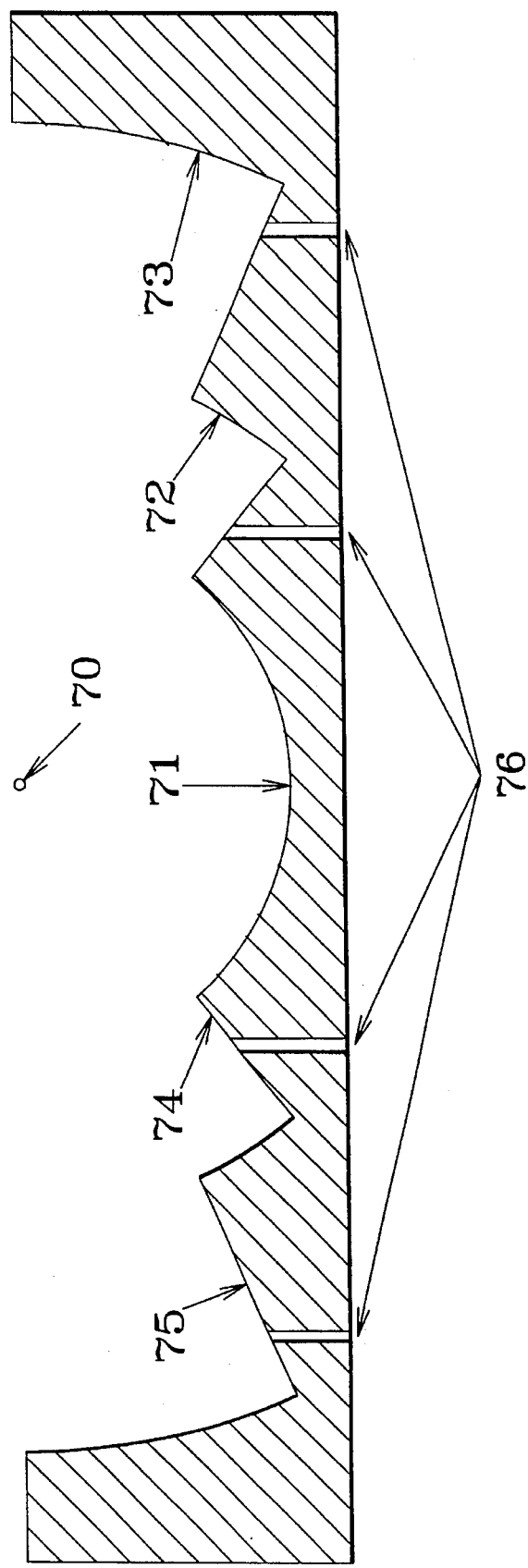
FIG. 12 is a cross-section of a multi-section reimaging reflector.

The mushroom lens 39 assists in the thermal protection of the TIR lens 40 when high-power sources are used. The TIR lens may consist of plastic; and the smooth mushroom lens can be made of glass, which can withstand high temperatures and act as an insulating barrier between the TIR lens and the light source. A glass mushroom lens would not have the ventilation aperture 39f of the plastic version shown in FIG. 10. Instead, ventilating holes would be used in the reflector, to draw heat away from the envelope. In fact, a multisection reflector can be used to minimize the optical impact of this ventilation. FIG. 12 shows a three-section reflector with optically active hemispheric sections 71, 72, and 73, with common centers at 70 and inactive conic sections 74 and 75, with common apices at 70. The ventilation holes could be in the inactive conic sections.

More generally, a reimaging reflector used with the TIR lens need not be restricted to hemispheric sections. It can depart from a sphere in order to compensate for the thickness and shape of the envelope around the light source, such as cylindrical section 16c in FIG. 13. This aspheric reflector shape is thus generated as a result of ray tracing from the source through the given envelope, thence to an external reflector sub-element. The local slope of this reflector is such as to return a ray back through the envelope to reimage the source in spite of the aberrations caused by the envelope. The resultant reimaging is consequently more accurate in placement and shape, so as to minimize source self-absorption and consequently maximize the optical efficiency of the system. Depending upon the exact nature of the source, the source's image may be placed below the source, as in FIG. 8 (the preferred placement for the mushroom lens), to the side of the source, or above the source.

Figure 13:
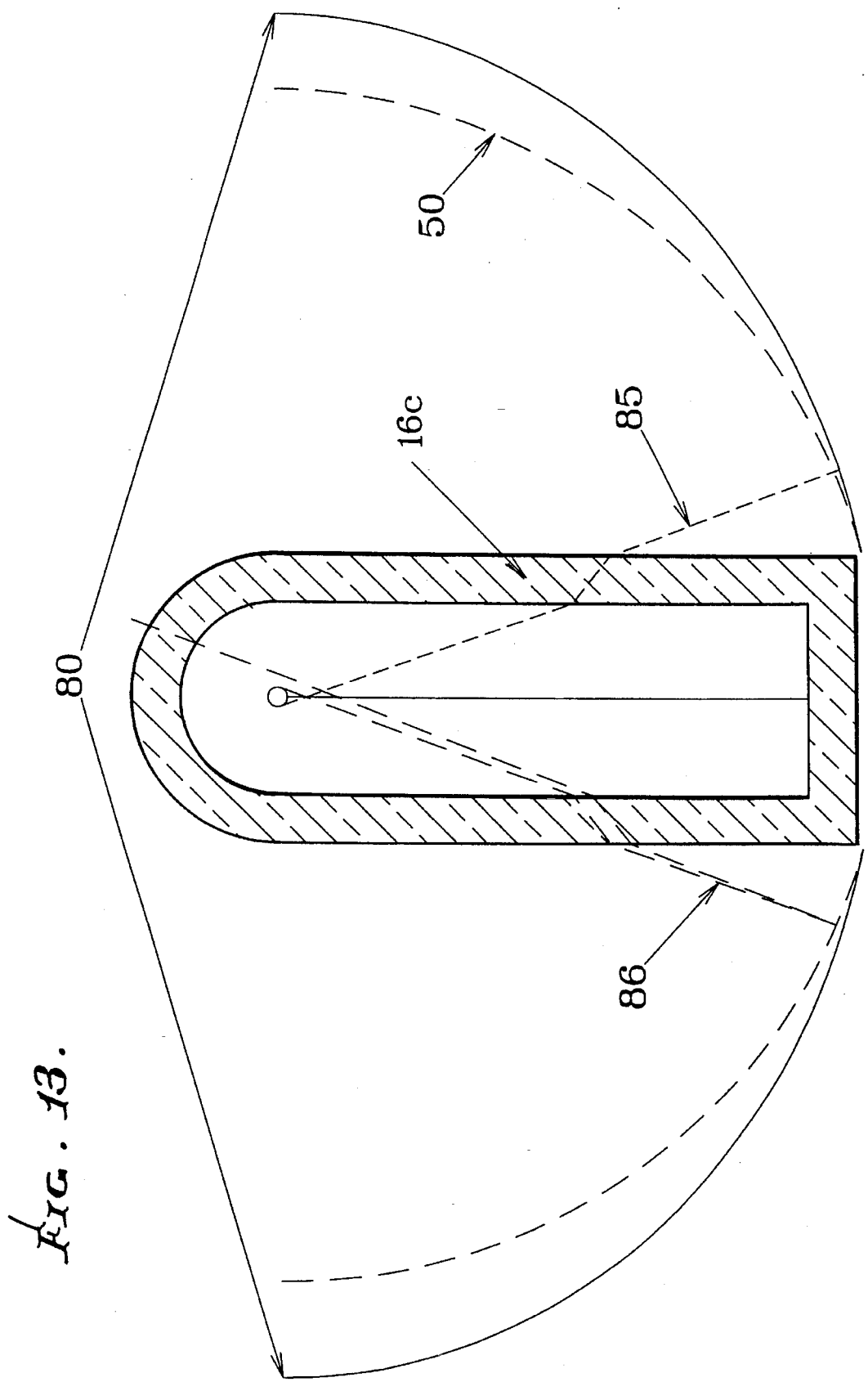
FIG. 13 is a cross-section of an aspheric reimaging reflector.

FIG. 13 shows the exact retroreflection of tangent ray 85 by aspheric reflector 80, which ensures maximum efficiency of reimaging. In contrast, note the action of hemispherical reflector 50 upon corresponding tangent ray 86. The sideways net displacement of rays by cylindrical section 16c causes the hemisphere's reimaging to be aberrated, blurring the reimaging (as shown by ray 86 not being exactly returned) and reducing the brightness of the reflected light. This type of aspheric reflector is applicable to compensating for any non-spherical envelope.

Figure 14:
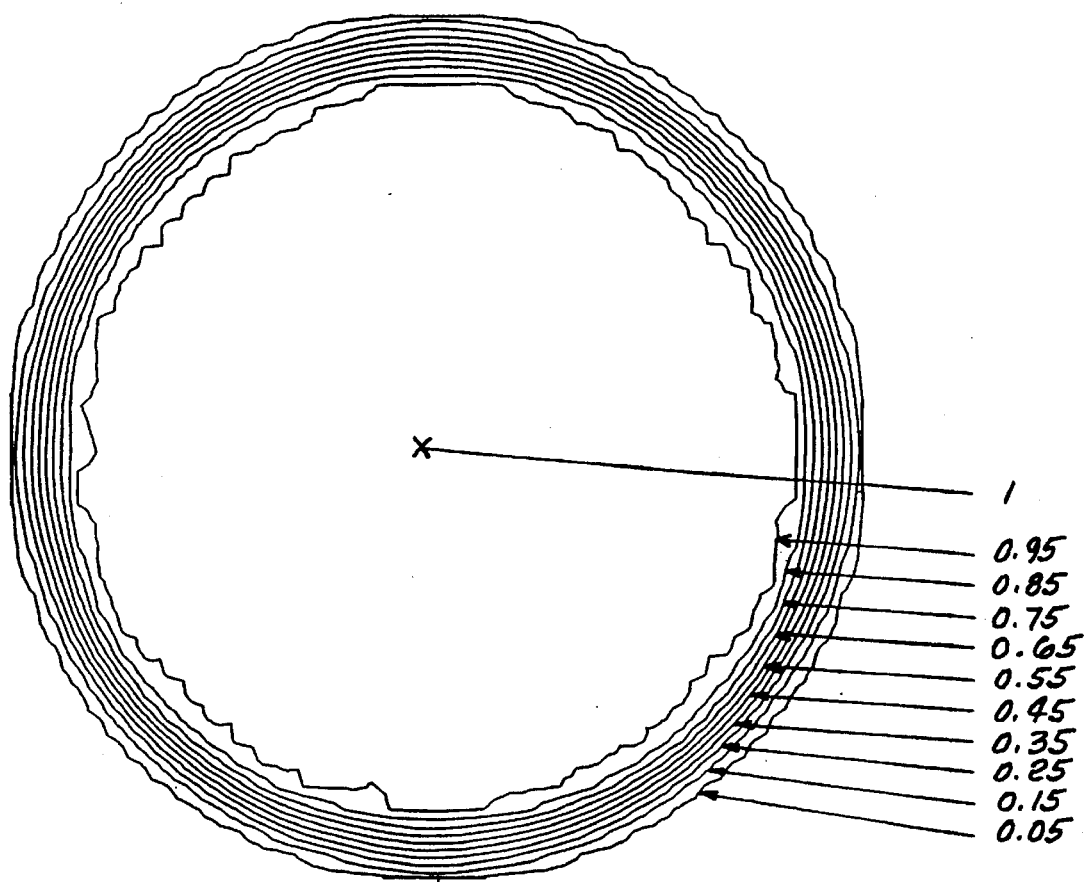
FIG. 14 is a flux contour map of the light flux desity above TIR lens 40 an FIG. 14a is the corresponding three-dimensional plot of this flux density.
Figure 14A:
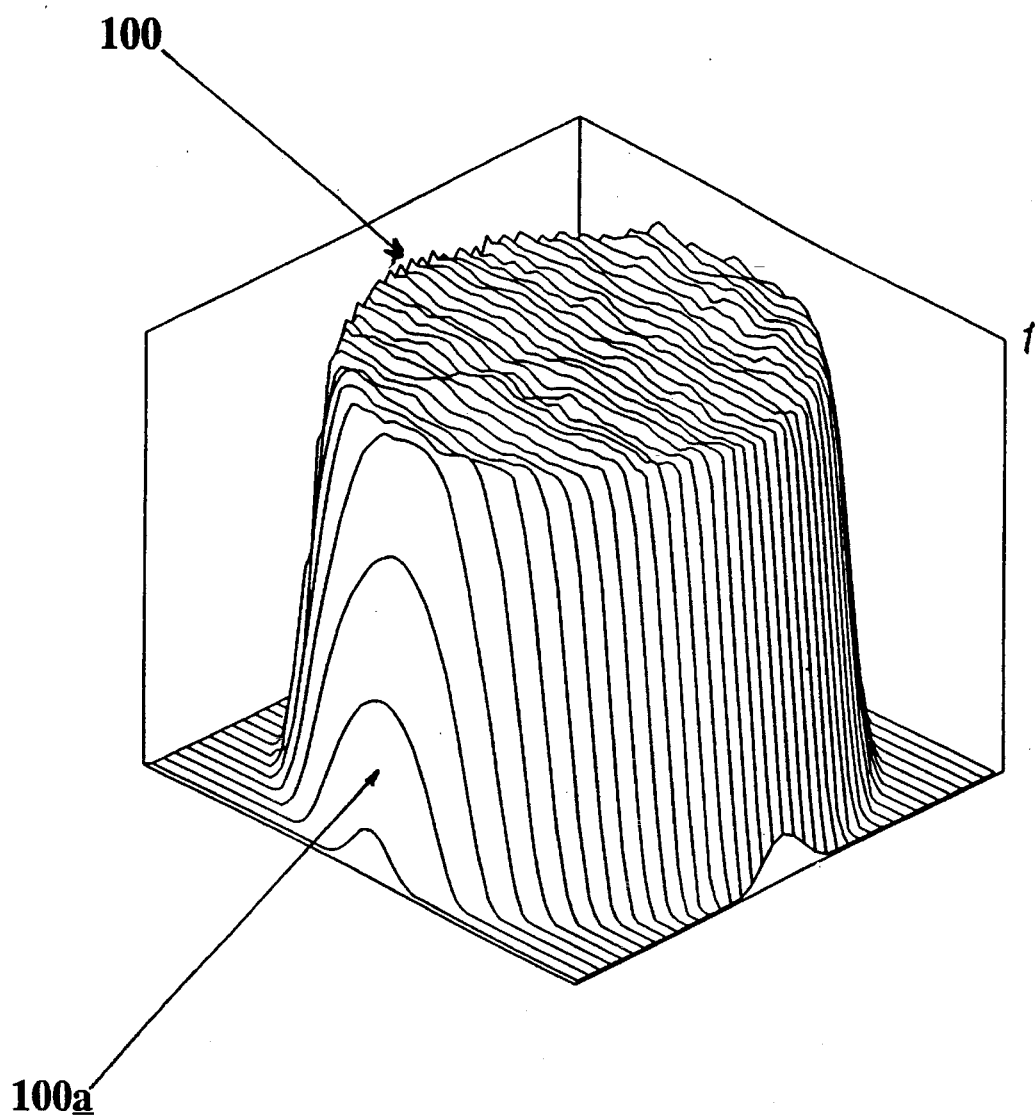

Similarly to FIG. 2, FIG. 14 shows a contour map of a computerized ray trace generating the uniform light flux density just above TIR lens 40, with relative density levels (0.05 to 1) mostly crowded at the edge of the lens. FIG. 14a shows the corresponding three-dimensional plot of this flux density, better showing its difference from FIG. 2b. There is a prominent central flat zone 100, with steep fall off of light flux per unit area at edges 100a of the distribution. The "bumps" in zone 100 are due to the intrinsically statistical nature of the randomly generated Monte Carlo computer ray trace.

Figure 15B:
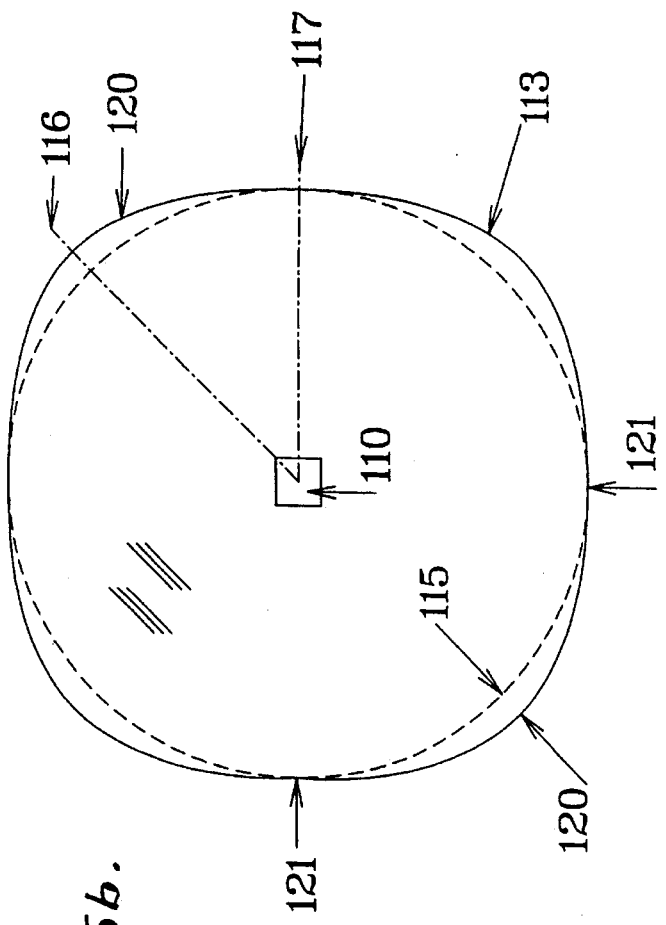
FIG. 15a is a cross-section and 15b a plan view of a mushroom lens for a light-emitting diode.
Figure 15A:
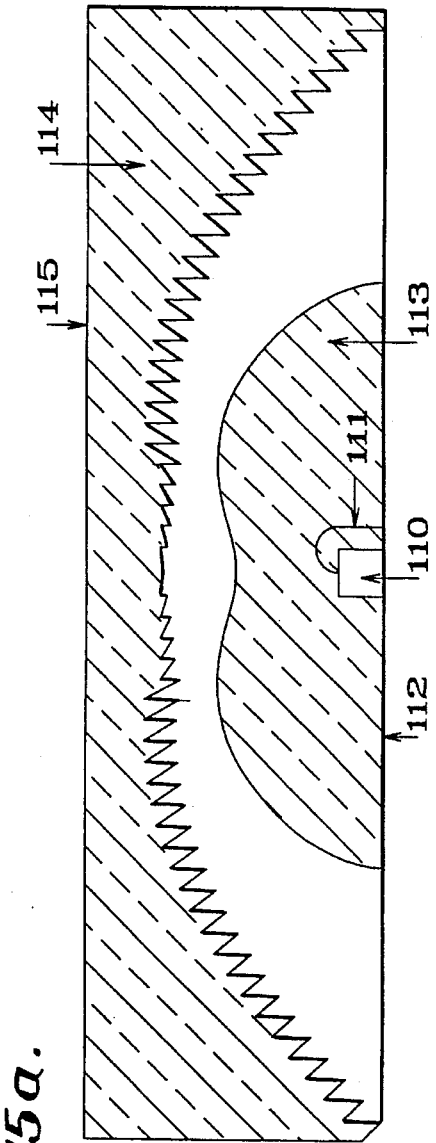

Light sources without envelopes, such as light emitting diodes (LEDs), can benefit from a mushroom deviator lens. FIG. 15a shows LED 110, with typical power-delivery wire 111 and planar reflector 112. The LED is embedded in mushroom lens 113, shaped to cause TIR lens 114 to have uniform output at exit face 115. For the sake of accommodating differential thermal expansion from heat generated by the operation of the LED, mushroom lens 113 may be made of an elastomeric material such as optical-grade silicone. Plan view 15b shows how a mushroom lens 113 would deviate from circular profile 115, to correspond to directional differences in a light source. LEDs typically have the shape of a cube, so that their output is greater in the direction 116 of the cube diagonal than in the direction 117 perpendicular to the cube face. To compensate, the mushroom lens may have somewhat different cross sections in these two directions, as seen in FIG. 15*b*. Note corresponding greater and lesser curvatures about the central axis, at 120 and 121. This methodology may be utilized in any source with angular intensity I(Θ, Φ) that is a function of horizontal angle Φ in the plane of the TIR lens. The collector hemisphere 32 of FIG. 4 would be subdivided into a sufficiently large number of gores as to accurately assess the Φ variation in I.

In summary, the mushroom-shaped, light-deviating lens is a powerful new way to control the output of a TIR lens. Improved collimation is provided because the entire beam will have the same angular spread, resulting in improved beam propagation over conventional parabolic reflectors, which have very non-uniform output. This allows the use of holographic diffusers and lenticular lenslet arrays to produce tailored output intensity, because the uniform input from the TIR lens is crucial to the use of these devices, which can be made integral with the output face of the TIR lens. This enables compact LED light sources with specifically tailored output to be available for automobile tail-lights and both small and large electronically controlled message signs.

We claim:

1. In combination
   a) a TIR lens having a central axis, and toward which light from a light source is to be directed, and
   b) a light ray deviator positioned along the path of light travel between said source and the TIR lens, for deviating light rays toward portions of the lens spaced from said axis, thereby to more evenly distribute light flux at the output of said TIR lens,
   c) said deviator being a non-imaging optical element for transforming the cumulative angular distribution of intensity of light from said source into a different distribution, which said TIR lens forms into a uniform beam.

2. The combination of claim 1 wherein said deviator is a light refractor.

3. The combination of claim 1 wherein said TIR lens has
   i) an entry face to receive incidence of light flux
   ii) an exit face to pass light to the lens exterior, and
   iii) a Totally Internally Reflecting face angled relative to said entry and exit faces to redirect toward the exit face the light flux incident on said entry face.

4. The combination of claim 1 including said source from which light is transmitted for incidence on said entry face.

5. The combination of claim 1 wherein said source and deviator are positioned in such proximity to the TIR lens that light traveling from the TIR lens to the display is collimated.

6. The combination of claim 1 wherein the TIR lens consists of molded plastic material, and the deviator is a glass lens.

7. In combination
   a) a TIR lens having a central axis, and toward which light from a light source is to be directed, and
   b) a light ray deviator positioned along the path of light travel between said source and the TIR lens, for deviating light rays toward portions of the lens spaced from said axis, thereby to more evenly distribute light flux at the output of said TIR lens,
   c) and wherein said deviator has dome shape in a direction toward the TIR lens.

8. The combination of claim 7 wherein the deviator is a Fresnel lens.

9. The combination of claim 8 wherein the deviator and the TIR lens have a common central axis, and the TIR lens has facets facing toward the deviator, and the deviator has Fresnel lens facets facing toward the TIR lens.

10. The combination of claim 9 wherein the TIR lens facets are equal in number with the Fresnel lens facets.

11. In combination
    a) a TIR lens having a central axis, and toward which light from a light source is to be directed, and
    b) a light ray deviator positioned along the path of light travel between said source and the TIR lens, for deviating light rays toward portions of the lens spaced from said axis, thereby to more evenly distribute light flux at the output of said TIR lens,
    c) and wherein the dome shape of the deviator is hemispherical.

12. In combination
    a) a TIR lens having a central axis, and toward which light from a light source is to be directed, and
    b) a light ray deviator positioned along the path of light travel between said source and the TIR lens, for deviating light rays toward portions of the lens spaced from said axis, thereby to more evenly distribute light flux at the output of said TIR lens,
    c) and wherein the deviator has mushroom profile.

13. The combination of claim 12 including a ventilation hole in the mushroom deviator.

14. The combination of claim 12 wherein the deviator is a lens having an outer surface with said mushroom lens shape, and a concave inner surface of greater curvature than curvature defined by said outer surface.

15. The combination of claim 14 including a hemispherically shaped reflector at the side of the deviator opposite the TIR lens to receive light from said source and to reimage the source at a location between the source and said reflector.

16. The combination of claim 15 wherein the reflector has an upper cone-shaped section located to prevent multiple reflections back and forth across the hemispherical reflector.

17. The combination of claim 12 wherein said light source is a light emitting diode embedded in said deviator lens.

18. The combination of claim 17 wherein the light emitting diode has a non-cylindrical shape, and the deviator mushroom-shaped outer surface has alternating greater and lesser sequential curvatures in planes normal to said axis.

19. The combination of claim 18 including a planar reflector at the bottom of the deviator to receive downward-directed light from the light emitting diode and to reflect said light upwards to the TIR lens.

20. The combination of claim 19 wherein the deviator has a hemispherical shape with an external Fresnel lens.

21. In combination
    a) a TIR lens having a central axis, and toward which light from a light source is to be directed, and
    b) a light ray deviator positioned along the path of light travel between said source and the TIR lens, for deviating light rays toward portions of the lens spaced from said axis, thereby to more evenly distribute light flux at the output of said TIR lens,
    c) and including a reflector extending about said axis at the side of the deviator opposite the TIR lens to reflect light from the source back toward the source.

22. The combination of claim 21 including a ventilation hole in the reflector.

23. The combination of claim 21 wherein the reflector has multiple optically active hemispheric sections with common centers, with inactive conic sections, each of which is between two of the hemispheric sections, said conic sections having common apices at the common centers of said hemispheric sections.

24. The combination of claim 21 wherein the reflector is aspherical for reimaging the source at a location adjacent to said source through a non-spherical envelope situated between said source and said reflector.

25. In combination
   a) a TIR lens having a central axis, and toward which light from a light source is to be directed, and
   b) a light ray deviator positioned along the path of light travel between said source and the TIR lens, for deviating light rays toward portions of the lens spaced from said axis, thereby to more evenly distribute light flux at the output of said TIR lens,
   c) and including a liquid crystal display positioned to receive backlighting from the TIR lens.

26. In combination
   a) a TIR lens having a central axis, and toward which light from a light source is to be directed, and
   b) a light ray deviator positioned along the path of light travel between said source and the TIR lens, for deviating light rays toward portions of the lens spaced from said axis, thereby to more evenly distribute light flux at the output of said TIR lens,
   c) and including said source from which light is transmitted for incidence on said entry face,
   d) and including a liquid crystal display positioned to receive backlighting from the TIR lens.

27. In combination
   a) a TIR lens having a central axis, and toward which light from a light source is to be directed, and
   b) a light ray deviator positioned along the path of light travel between said source and the TIR lens, for deviating light rays toward portions of the lens spaced from said axis, thereby to more evenly distribute light flux at the output of said TIR lens,
   c) and including said source from which light is transmitted for incidence on said entry face,
   d) a liquid crystal display positioned to receive backlighting from the TIR lens,
   e) and including a light diffuser located between said TIR lens and said liquid crystal display.

28. In combination
   a) a TIR lens having a central axis, and toward which light from a light source is to be directed, and
   b) a light ray deviator positioned along the path of light travel between said source and the TIR lens, for deviating light rays toward portions of the lens spaced from said axis, thereby to more evenly distribute light flux at the output of said TIR lens,
   c) and including said source from which light is transmitted for incidence on said entry face,
   d) and wherein said light source comprises an LED.

* * * * *